United States Patent [19]

Kovacs

[11] Patent Number: 4,532,753

[45] Date of Patent: Aug. 6, 1985

[54] METHOD OF AND APPARATUS FOR FORMING, FILLING AND SEALING PACKAGES

[75] Inventor: Lloyd Kovacs, Sheboygan, Wis.

[73] Assignee: Hayssen Manufacturing Company, Sheboygan, Wis.

[21] Appl. No.: 467,595

[22] Filed: Feb. 18, 1983

[51] Int. Cl.³ .............................................. B65B 9/06
[52] U.S. Cl. ...................................... 53/451; 53/551; 53/552; 53/373
[58] Field of Search ................. 53/551, 552, 451, 550, 53/554, 373, 479

[56] References Cited

U.S. PATENT DOCUMENTS

| | | | |
|---|---|---|---|
| 2,145,941 | 2/1939 | Maxfield | 53/551 |
| 2,953,882 | 9/1960 | Tew | 53/126 |
| 3,262,244 | 7/1966 | Cutler et al. | 53/551 |
| 3,334,466 | 8/1967 | Scholle | 53/451 |
| 3,340,129 | 9/1967 | Grevich | 53/552 |
| 3,668,815 | 6/1972 | Henry et al. | 53/551 |
| 3,849,965 | 11/1974 | Dominici | 53/551 |
| 4,288,965 | 9/1981 | James | 53/451 |

FOREIGN PATENT DOCUMENTS

1334616 10/1973 United Kingdom ................. 53/451

*Primary Examiner*—Daniel C. Crane
*Attorney, Agent, or Firm*—Senniger, Powers, Leavitt and Roedel

[57] ABSTRACT

Method of and apparatus for forming, filling and sealing packages in which flexible packaging material is formed into tubing, the tubing is fed downwardly and transversely heat sealed at package length intervals by closing a pair of sealing members, a quantity of the product with which the packages are to be filled is delivered into the lower end of the tubing to provide a fill for each package, the tubing is pinched closed, after the delivery of each fill, above the level of the next seal to be made, the pinch is maintained as the sealing members are opened, following the formation of each seal, to keep product for the next fill from dropping down on the seal, and air is blown on the seal to cool it while the pinch is maintained.

10 Claims, 16 Drawing Figures

METHOD OF AND APPARATUS FOR FORMING, FILLING AND SEALING PACKAGES

BACKGROUND OF THE INVENTION

This invention relates to methods of and apparatus for forming, filling and sealing packages, and more particularly to vertical form-fill-seal packaging methods and apparatus.

The invention is especially directed to the type of package forming, filling and sealing in which flexible packaging material is formed into tubing, the tubing being fed downwardly and transversely heat sealed at package length intervals, a quantity of the product with which the packages are to be filled being delivered into the lower end of the tubing to provide a fill for each package. It has been found that, in carrying out this type of packaging, if product drops down in the tubing on a seal before the seal has adequately set, the strain on the seal may be sufficient to spoil it. This invention is directed toward solving that problem.

SUMMARY OF THE INVENTION

Among the several objects of the invention may be noted the provision of an improved method of and apparatus for forming, filling and sealing packages wherein each seal is efficiently protected against damage from product drop without unduly slowing down production of packages.

In general, the method and apparatus of this invention are applied to the forming, filling and sealing of packages wherein flexible packaging material is formed into tubing, the tubing extending downwardly, the tubing is fed downwardly and transversely heat sealed at package length intervals by a pair of sealing members, and a quantity of the product with which the packages are to be filled is delivered into the lower end of the tubing to provide a fill for each package, being characterized in that with the sealing members open and after the delivery of the fill into the tubing, and before the next seal is made, the tubing is pinched closed above the sealing members to keep product from dropping down in the tubing onto the next seal, the sealing members are closed to form the next seal, then opened, the pinch is maintained, and air is blown on the seal to cool it.

Other objects and features will be in part apparant and in part pointed out hereinafter.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
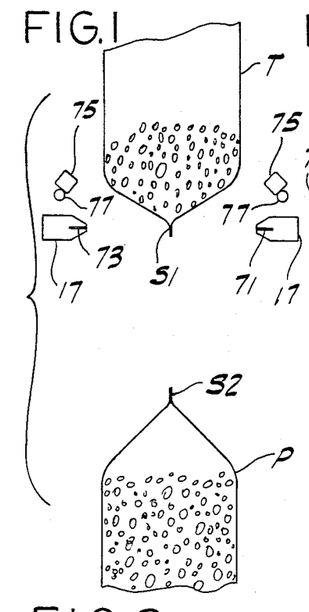
FIGS. 1, 2, 2A and 3-5 are diagrammatic views illustrating the method of the invention and the sequence of operation of certain components (sealing jaws and pinch jaws) of apparatus embodying the invention.
Figures 2, 2A:
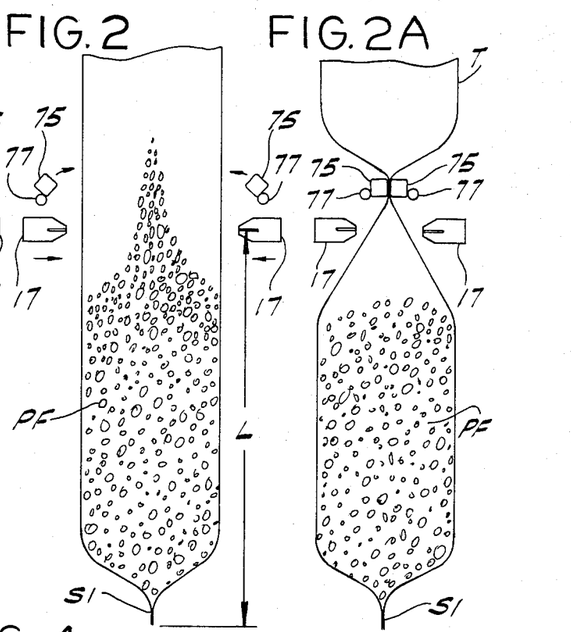
Figure 5:
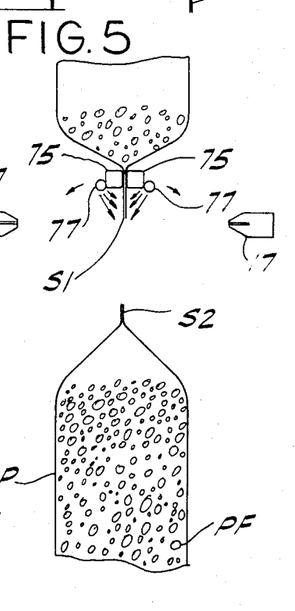

Referring first to FIGS. 1, 2, 2A and 3-5 of the drawings, the invention is shown as it relates to the forming, filling and sealing of packages involving the forming of flexible packaging material, for example a single web of flexible packaging material, into tubing designated T, with the tubing extending downwardly, the tubing being intermittently fed downwardly and transversely heat sealed at package length intervals L, a quantity of the product with which the packages are to be filled being delivered into the lower end of the tubing to provide a fill for each package during the intervals between successive sealing operations. As herein illustrated, the forming, feeding and sealing of the tubing may be carried out by means of vertical form-fill-seal apparatus such as shown in the coassigned U.S. Pat. No. 4,288,965, of Robert C. James, issued Sept. 15, 1981, involving a pair of heat sealing members, more particularly a pair of heat sealing jaws, intermittently movable in and out in a fixed horizontal plane between the fully open position in which they are illustrated in FIGS. 1, 2 and 5 and a closed position in sealing engagement with the tubing (see FIG. 3) for forming a transverse seal S across the tubing. However, it is to be understood that, broadly considered, these operations may be carried out by means of other types of vertical form-fill-seal apparatus including, for example, apparatus of the type in which the sealing jaws are movable up and down, closing on the tubing at the top of their stroke and pulling down a package length increment of the tubing, the sealing jaws then opening and moving up to the top of their stroke, so as to provide a package length increment of the tubing extending down from the sealing jaws at the top of their stroke.

The method of the invention is characterized in that the tubing is pinched closed above the sealing members after the tubing has been fed downwardly each package length interval and following the completion of the delivery of the fill for the next package to be formed, thereby to keep product for the next fill from dropping down in the tubing onto the next seal, the sealing members are closed to form the next seal, the sealing members are opened, the pinch is maintained as the sealing members open, and, while holding the pinch to keep product from dropping down into the next seal as the sealing members open, air is blown on the seal to cool it.

FIGS. 1, 2, 2A and 3-5 illustrate the method as it relates to the type of operation in which the heat sealing members or jaws, which are designated 17, operate in a fixed generally horizontal plane, being movable relative to one another toward and away from one another between an open position (FIGS. 1, 2 and 5) spaced apart a distance somewhat greater than the diameter of the tubing T and a closed position (FIG. 3) in sealing engagement with the tubing for forming the transverse seal at S. Typically, although not essentially, one of the sealing jaws carries a knife at 71 adapted to be driven into a slot 73 in the other jaw when the jaws have closed (conventionally by means of an air cylinder) for transversely cutting the tubing through the seal S, forming the trailing or upper end seal S2 for the package being completed and the leading or lower end seal S1 for the next package to be formed.

FIG. 1 illustrates the sealing members 17 open at the end of one forming, filling and sealing cycle and the beginning of the next cycle. As shown therein, a completed package P is dropping away. The lower end of tubing T, sealed as indicated at S1, is at the level of the sealing jaws 17. This seal is cool as a result of a previous cooling operation as will become apparent as this description progresses. The tubing T is fed downwardly between the sealing members 17, one package length increment, i.e., to the point where its lower end is one package length L below the level of the sealing members as shown in FIG. 2. A measured quantity of the product with which the package is to be filled is delivered into the tubing from above (as is conventional in vertical form/fill/seal operations) and drops down in the tubing to the lower end of the tubing. The stated quantity of the product, which may be referred to as the package fill, is indicated at PF in FIG. 2.

With the sealing members 17 open, and after the delivery of the product into the tubing and before the next seal is made, the tubing is pinched closed above the sealing members as shown in FIG. 2A to keep product for the next package fill from dropping down in the tubing onto the next seal to be made. The pinching is effected by means of a pair of pinch members 75 extending transversely of the tubing generally parallel to the sealing members 17, the tubing extending down between these pinch members.

Figures 3, 4:
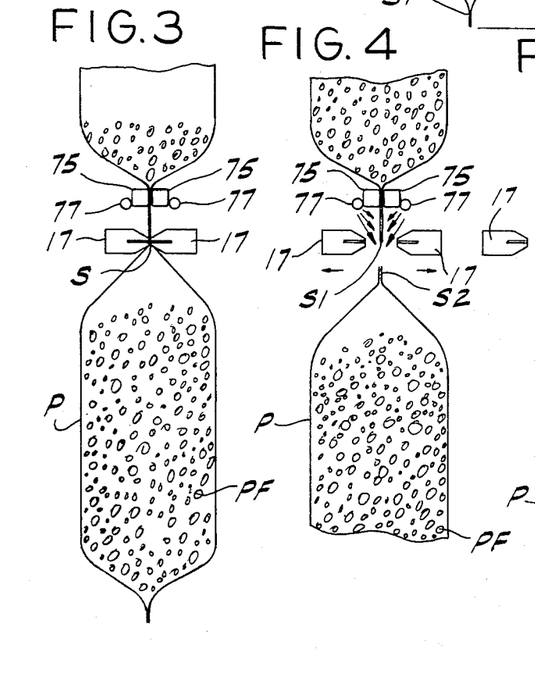

The sealing members 17 are then closed as shown in FIG. 3 to form the next seal S comprising the top (trailing) seal S2 for the package P being completed and the bottom (leading) seal S1 at the lower end of tubing T for the next package to be formed. With the sealing members closed, the knife 71 is actuated to cut through the tubing between the seals S2 and S1 to sever the completed package from the tubing.

The sealing members 17 are then opened, but the pinch is held on the tubing (above the level of the sealing members) as the sealing members are opened, as shown in FIGS. 4 and 5. That is, while the sealing members 17 open, and generally until they reach their fully open position the pinch members 75 are maintained closed. The completed package P drops away. As the sealing members open, and while holding the pinch on the tubing to keep product from dropping down onto the seal S1 just formed, air is blown on the seal S1 just formed to cool it as indicated by arrows in FIG. 4. The air is blown down on the seal from the vicinity of the pinch with the initial opening movement of the sealing members (FIG. 4) and continuing generally until they reach their fully open position (FIG. 5). More particularly, the air is blown down and in on opposite sides of the tubing against opposite sides of the seal by air blowing means 77 carried by the pinch members 75.

Figure 6:
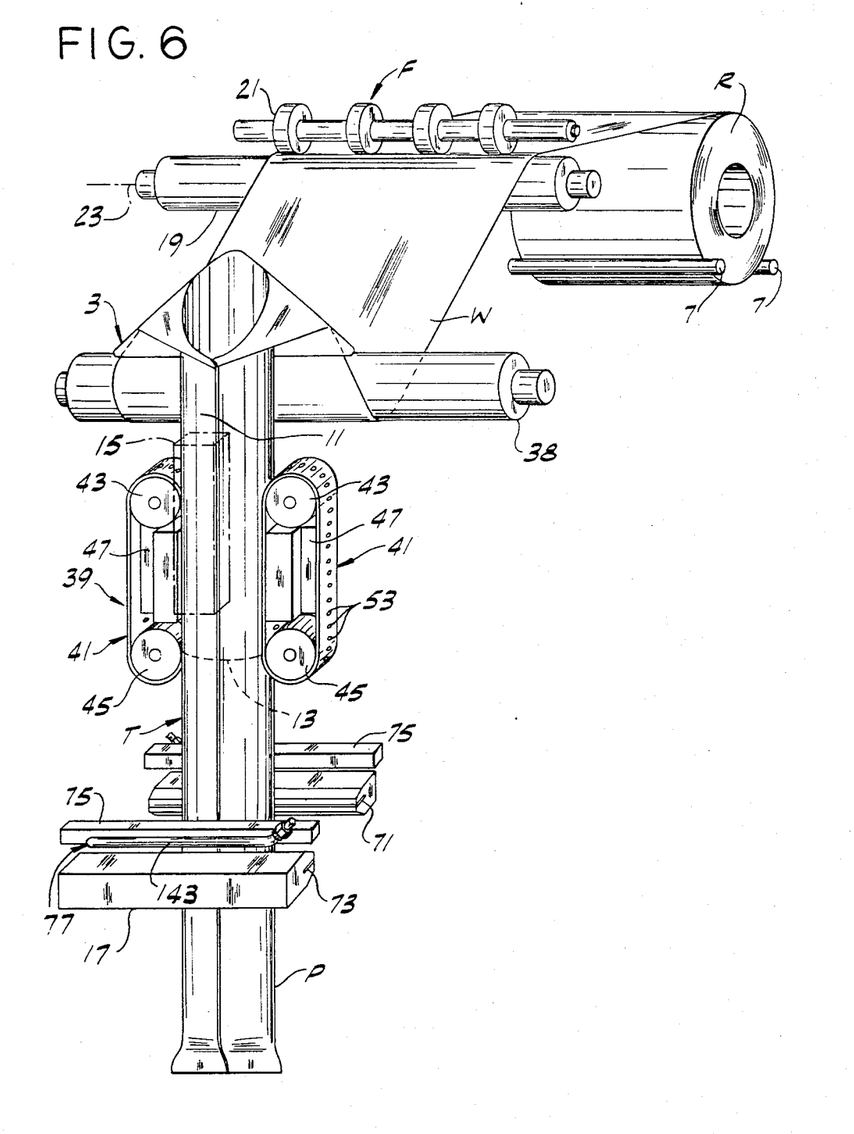
FIG. 6 is a perspective of a vertical form/fill/seal machine embodying the invention.
Figure 7:
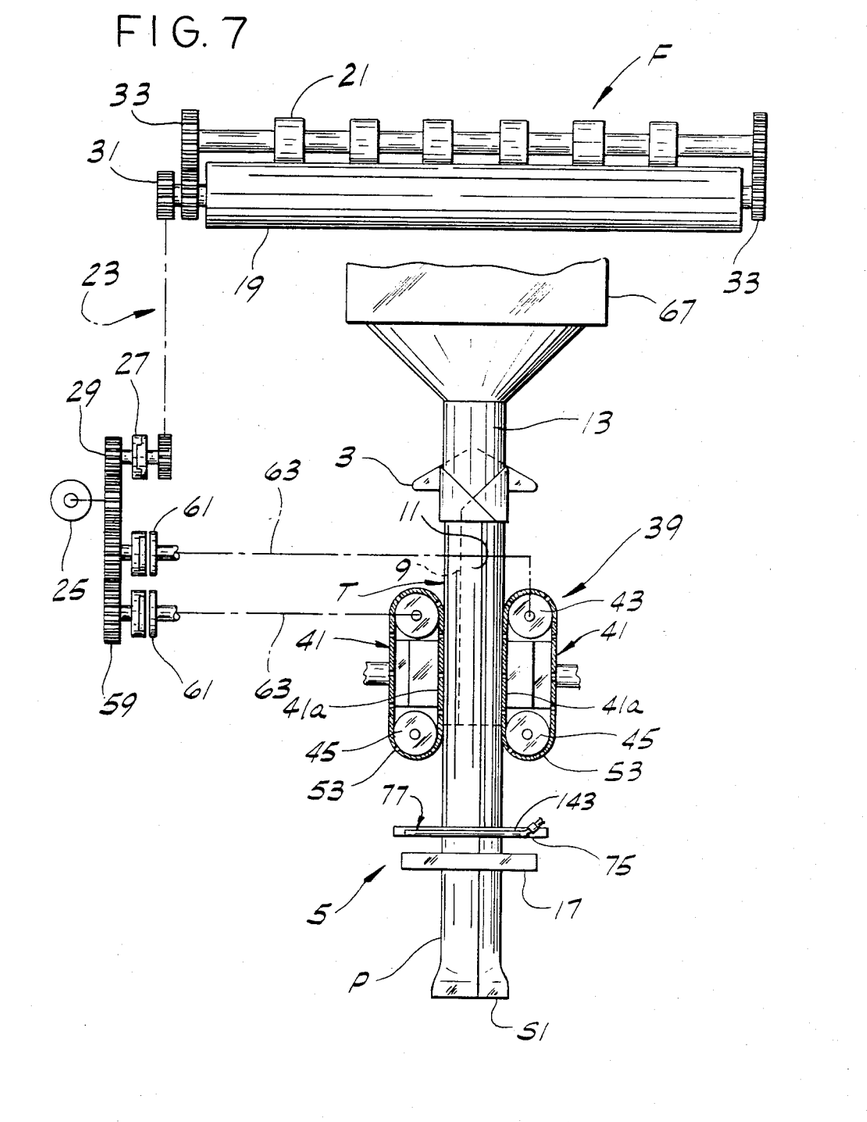
FIG. 7 is a front elevation of FIG. 6, showing certain drive mechanism of the machine.

Now referring to FIGS. 6 and 7, the invention is shown as incorporated in a vertical form-fill-seal apparatus such as shown in the aforesaid coassigned U.S. Pat. No. 4,288,965 wherein a web W of flexible packaging material is pulled from a supply, fed over means 3 for forming the web into the tubing T, product to be packaged is provided in the tubing, and sealing operations are performed on the tubing as generally indicated at S to seal it to form packages. The packaging material may be low density polyethylene film, for example, and the supply may be constituted by a roll R of the film suitably supported as indicated at 7. The forming means 3 may be a forming shoulder generally of a conventional type such as shown, for example, in the coassigned U.S. Pat. No. 3,050,906 issued Aug. 28, 1962, U.S. Pat. No. 3,449,888 issued June 17, 1969, and U.S. Pat. No. 3,664,086 issued May 23, 1972.

As shown in FIGS. 6 and 7, the forming shoulder 3 forms the web W of packaging material into the tubing T with the longitudinal margins 9 and 11 of the Web W in lapping relationship, and directs the tubing downwardly around a vertically extending, hollow mandrel 13. As illustrated, margin 9 is on the inside, margin 11 on the outside. At 15 in FIG. 6 is diagrammatically indicated suitable means for sealing the lapping margins 9 and 11 of the web to form a longitudinal seam for the tubing. Product is provided in the tubing T via the hollow mandrel 13 in suitable conventional manner, and the tubing is transversely heat sealed at package length intervals by the heat sealing jaws or bars 17 at 5 below the lower end of the mandrel. The sealing jaws or bars 17 are operable in a fixed horizontal plane below the lower end of the mandrel to form the top seal S2 for the package being completed and the bottom seal S1 for the next package to be formed. One of the seal bars carries the knife 71 and the other has the groove 73 receiving the knife for cutting transversely between the seals made at 5 to separate the completed package P from the tubing. The tubing is intermittently fed downward one package length increment, the jaws 17 being open. The tubing dwells between successive feed cycles, the jaws 17 being closed on the tubing for the transverse sealing operation during each dwell.

The web W is intermittently pulled from supply roll R, measured for each sealing operation at 5, and fed forward toward the forming shoulder 3 by means indicated generally at F located between the supply roll and the forming shoulder. This means F is intermittently operable to feed the web forward one package length increment in a given interval, acting as a web feeding and measuring or metering means. As illustrated, it comprises a lower roll 19 and an upper roll 21 with means indicated generally at 23 for intermittently driving these rolls through a predetermined interval corresponding to the desired length for the packages to be formed to feed the web forward one such increment. As shown in FIG. 7, the driving means 23 comprises a continuously operating electric motor/speed reducer unit 25 driving the input of an electric clutch/brake unit 27 via gearing indicated at 29, the output of the clutch/brake unit being connected to the lower roll 19 as indicated at 31. The rolls 19 and 21 are geared together as indicated at 33. The clutch of unit 27 is adapted intermittently to be engaged and the brake of unit 27 disengaged for driving the rolls 19 and 21 to feed forward the requisite package length increment of web W on each feed cycle by a suitable programmable control 35 which is under the control of an encoder 37 (see FIG. 11), the clutch being disengaged and the brake engaged to terminate the feed cycle and remaining so for the dwell of the web W and tubing T, the clutch then being engaged and the brake disengaged for the next feed cycle.

The web W travels from the measuring and feeding rolls 19 and 21 under a guide roll 38 and thence up to and around forming shoulder 3. The increment of the web W fed forward by the measuring and feeding rolls 19 and 21 is taken up and pulled over the forming shoulder 3 under tension by tubing feeding means indicated generally at 39 in FIGS. 6 and 7 below (downstream from) the forming shoulder. This tubing feeding means 39 acts to pull the web over the forming shoulder 3 under tension to maintain the web taut. The tubing feeding means tends to draw the tubing down (forward) on the mandrel 13 a distance greater than the package length increment in the stated interval of operation of the rolls 19 and 21. The draw-down force on the tubing is relatively low. While means 39 tends to draw the tubing T down a greater distance than the package length increment, the tubing is drawn down only a distance corresponding to the package length increment (the tension is insufficient to stretch it to any substantial extent), and the package length increment of the web W metered out and fed forward by the rolls 19 and 21 is thereby taken up and pulled over the forming shoulder 3 under tension, with the tension substantially uniform for proper tracking of the material over the forming shoulder.

The tubing feeding means 39, as illustrated, comprises a pair of endless belts, and more particularly a pair of vacuum belts each designated 41 at opposite sides of the mandrel 13 (for vacuum gripping the tubing to feed it downward). Each belt is a flat belt trained around an upper pulley 43 and a lower pulley 45 and so arranged as to have a downwardly movable inner reach 41a engageable with the tubing T at the respective side of the mandrel 13. The two pulleys for each belt are mounted on a block 47 having a vacuum passage therein in which a vacuum is drawn in suitable conventional manner via a vacuum hose (see U.S. Pat. No. 4,288,965). The belt has holes 53 spaced at suitable intervals throughout its length. The inner reach 41a of the belt travels in sealing engagement with the face of the block 47 toward the mandrel 13, i.e., the inside of the block, in register with the inlet end of the stated vacuum passage in the block. As the belt travels past the inlet end of this passage, vacuum is drawn through those holes 53 in the belt which are in communication with the inlet. The tubing on the mandrel 13 is thereby vacuum gripped to the inner reach 41a of the belt for being fed downward by the belt.

The vacuum belts 41 are operated intermittently for feeding the tubing T downward on the mandrel 13 concurrently with each operation of the web feeding rolls 19 and 21. The belts may be started in operation generally at the same time or somewhat before the rolls 19 and 21 start feeding the web W. They are operated at such a rate relative to the rolls 19 and 21 as to tend to feed the tubing downward at a rate faster than that at which rolls 19 and 21 feed the web forward, and may be stopped generally at the same time or shortly after the rolls 19 and 21 stop. Means for operating the belts in this manner is shown to comprise a gear drive 59 from the electric motor/speed reducer unit 25 to the input of each of a pair of air-operated slip clutches each designated 61, with individual drive trains as indicated at 63 from the outputs of the slip clutches to the upper pulleys 43 for the two belts 41. The slip clutches 61 are under control of an air valve 65 (FIG. 11) which is in turn controlled by the programmable control 35. The latter functions to actuate (engage) the slip clutches 61 to start driving the belts either at the same time or somewhat before the electric clutch/brake unit 27 is actuated, and to maintain the slip clutches engaged for driving the belts until the electric clutch/brake unit 27 is deactuated or somewhat thereafter, the slip clutches then being deactuated to stop the belts. While engaged, the slip clutches permit slip in the drives from the unit 25 to the belts.

In the operation of the apparatus of FIGS. 6 and 7, the motor/speed reducer unit 25 is operated continuously. The clutch/brake unit 27 is actuated (i.e., its clutch is engaged, its brake disengaged) in timed relation to a function of the apparatus such as a filling function, the encoder 37 being operable to signal the programmable control 35 to actuate the unit 27 to start driving rolls 19 and 21 to unwind the web W from the supply roll R and feed it forward at the appropriate time, e.g., when a scale such as indicated diagrammatically at 67 in FIG. 7 has weighed out the quantity of product (a "fill") to be delivered for a package, and has dumped the product for delivery down through the mandrel 13 into the tubing T. The unit 27 remains actuated for an interval such as to cause rotation of the rolls 19 and 21 to feed forward a package length increment of the web, and is then deactuated. The interval may be determined and controlled via the programmable controller 35 or by means of an optical scanning system operating in conjunction with registration marks at package length intervals on the web in the case of preprinted web, or by means measuring the rotation of the rolls 19 and 21 in the case of unprinted web, or in other suitable manner well known in the art.

The programmable control 35 (FIG. 11) operates to actuate the valve 65 for engaging the slip clutches 61 to start driving the belts 41 either at the same time or somewhat before the rolls 19 and 21 start feeding the web W forward toward the forming shoulder 3. Thus, when the rolls 19 and 21 operate to feed the web forward, the belts are in operation and act to draw down the tubing T formed as the web passes over the forming shoulder 3. The drive for the belts is such that they tend to travel at a rate greater than the rate at which rolls 19 and 21 feed the web forward. For example, they may tend to travel at a rate about 10% greater than the rate at which rolls 19 and 21 feed the web forward (that is, the belts if wholly free of any restraint would travel a distance 10% greater than the amount of web released (i.e., fed forward) by rolls 19 and 21. However, the tubing T cannot advance any faster than the rate at which rolls 19 and 21 feed the web forward without stretching (the web being caught in the nip of rolls 19 and 21) and the pull exerted by the belts on the tubing is relatively light and too low to cause any substantial stretching. Hence, the belts travel generally at a greater rate than the web and, in tending to travel faster than the web, exert a downward pull on the tubing T to tension it and thereby pull the material over the forming shoulder 3 under tension to maintain the web taut. The operation of the belts at a greater rate than the speed of the web feed is governed and controlled by slippage in the slip clutches 61, and by some slippage of the belts past the packaging material.

At the start of the downward feed of the tubing T, the sealing jaws or bars 17 are open, and remain open throughout the downward feed of the tubing off the lower end of the mandrel 13.

When the rolls 19 and 21 have measured out and fed forward one package length of web W, and the belts 41 have drawn the tubing T down one package length on the mandrel and fed one package length of the tubing T off the lower end of the mandrel, the clutch/brake unit 27 is deactuated to stop the rolls 19 and 21 and thereby stop the forward feed of the web, for the dwell of the web and the tubing for the sealing operation. The slip clutches 61 are deactuated either at the same time as the rolls 19 and 21 stop, or slightly thereafter. When deactuated, the slip clutches may be wholly disengaged so as to stop drives 63 to the belts 41, or they may remain lightly engaged to exert a light drive via 63 on the belts so that the belts exert a light draw-down force on the tubing to maintain tension in the tubing.

With the tubing T stopped, and with a fill PF in the tubing above the transverse seal S1 at the lower end of the tubing (this seal being one package length below the sealing jaws 17 and constituting the bottom seal for the package to be completed) the jaws are closed on the tubing to form the top seal for the package P being completed and the bottom seal S2 for the next package to be formed. The jaws then open, and rolls 19 and 21 and belts 41 are operated through the next feed cycle.

Figure 8A:
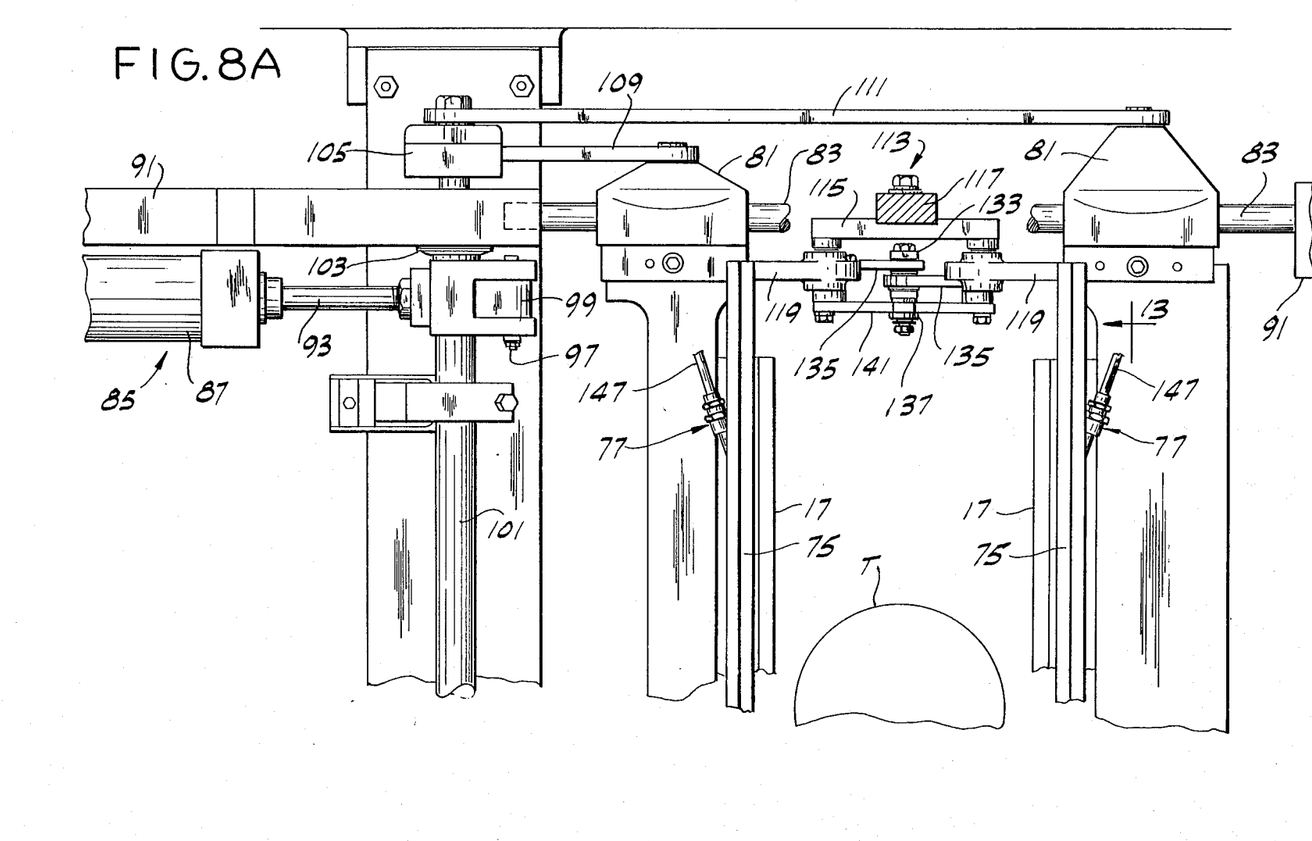
FIGS. 8A and 8B together constitute a plan, with parts broken away, of the sealing jaw and pinch jaw actuating mechanism of the apparatus; showing the sealing jaws in their open position and the pinch jaws in their open position.
Figure 8B:
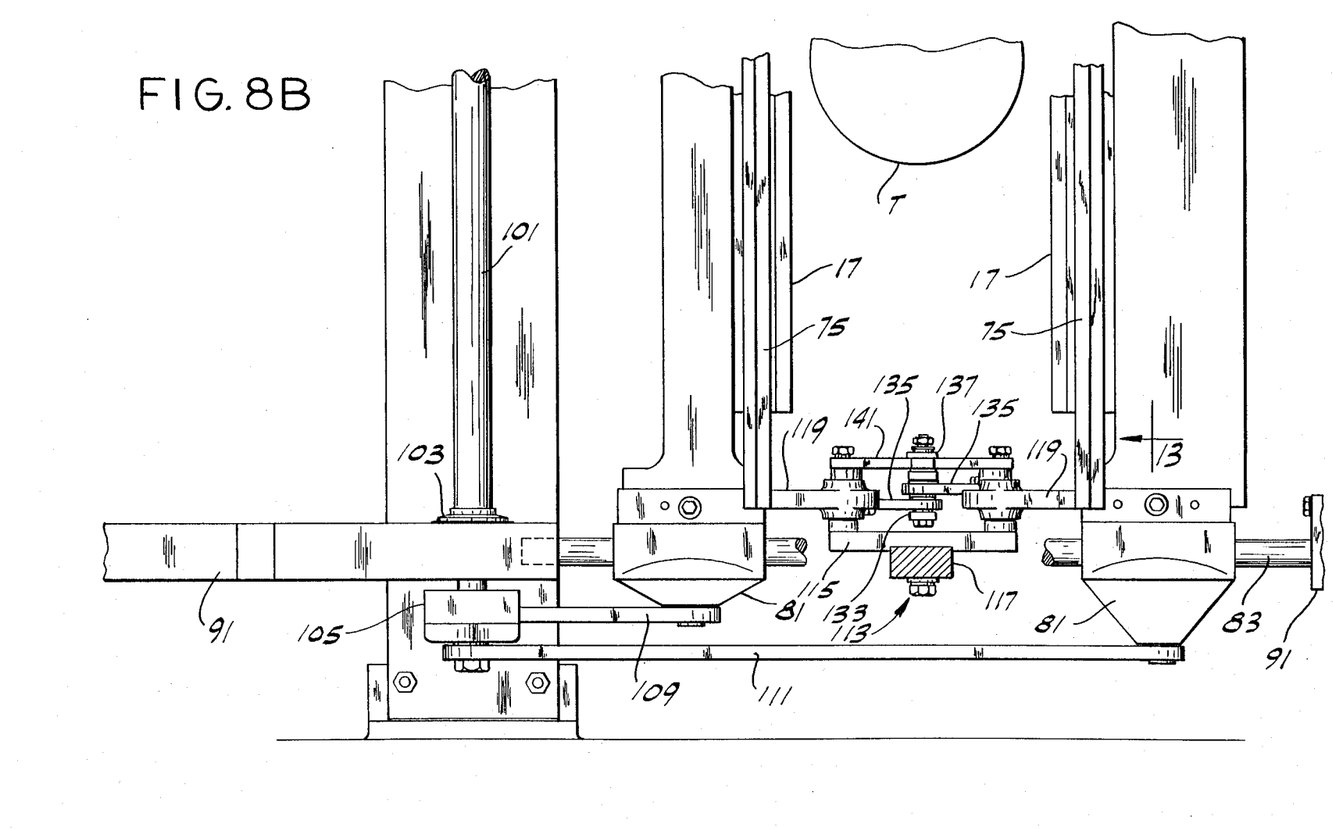
Figure 12:
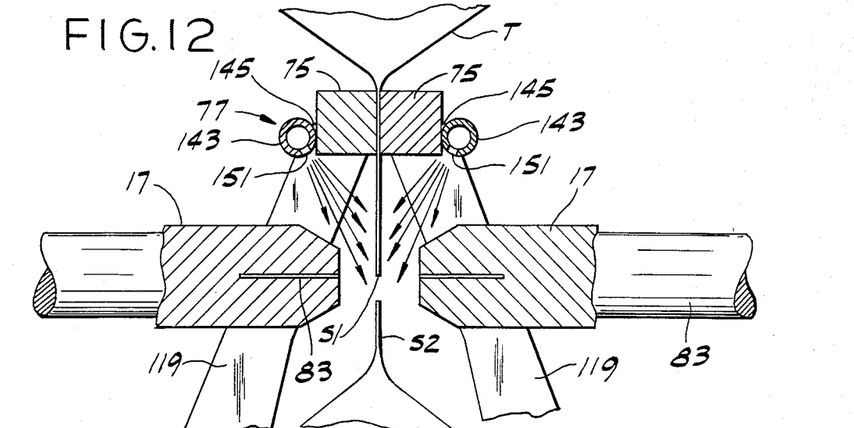
FIG. 12 is an enlarged view similar to FIG. 10 with parts in section and showing the sealing jaws partly open and the pinch jaws closed and air being blown on the seal (corresponding to FIG. 4)
Figure 13:
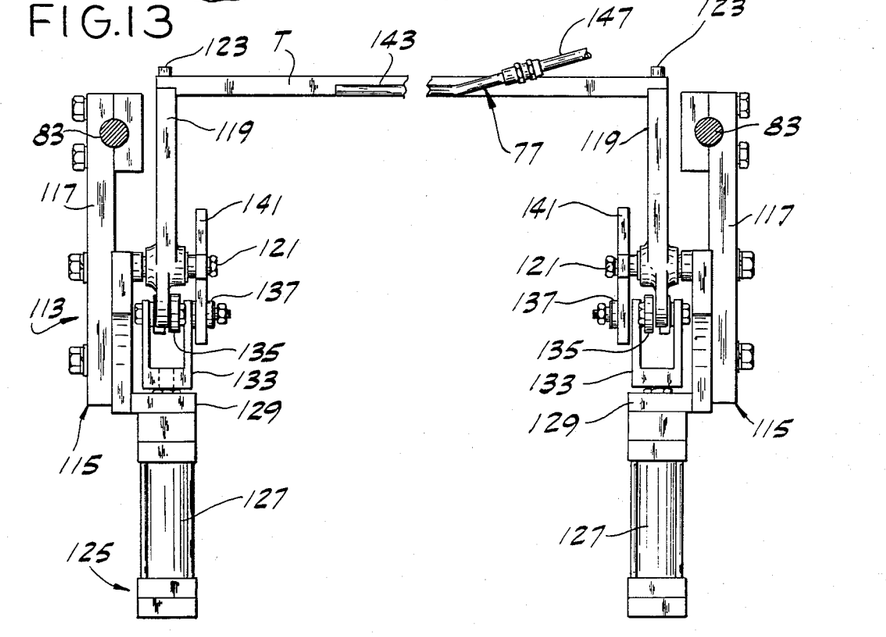
FIG. 13 is a view generally on line 13—13 of FIG. 8A, B.
Figure 14:
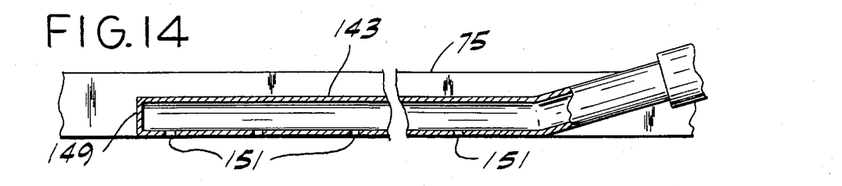
FIG. 14 is an enlarged fragment of FIG. 13.

As shown in FIGS. 8A and B and 9, each of the sealing jaws or bars 17 is mounted for movement transversely of its length in a horizontal plane by means of a pair of tubular slides 81 at its ends slidable on a pair of slide guide rods 83 extending horizontally parallel to one another at opposite sides of the apparatus. Means indicated generally at 85 is provided for sliding the sealing jaws back and forth on the rods toward and away from each other, this means being shown to comprise an air cylinder 87 pivoted at its tail end on a frame structure 91 of the apparatus, and having its piston rod 93 extending from its piston through its head end to a pin connection at 97 with a crank 99 on a cross-shaft 101 journalled in bearings 103 in the frame structure. Shaft 101 has a double crank 105 at each of its ends, each crank 103 having its lower end connected to the slides 81 for one of the jaws 17 by links 109, and its upper end connected to the slides 81 for the other jaw 17 by links 111. The arrangement is such that on extension of the piston rod 93 from the cylinder 87, the sealing jaws 17 are moved away from each other (see FIGS. 8A and B and 9), and on retraction of the piston rod the jaws are moved toward each other (FIG. 12). The cylinder 87 may be vertically arranged and operable on the shaft 101 via a rack and pinion mechanism, instead of as shown.

Figure 9:
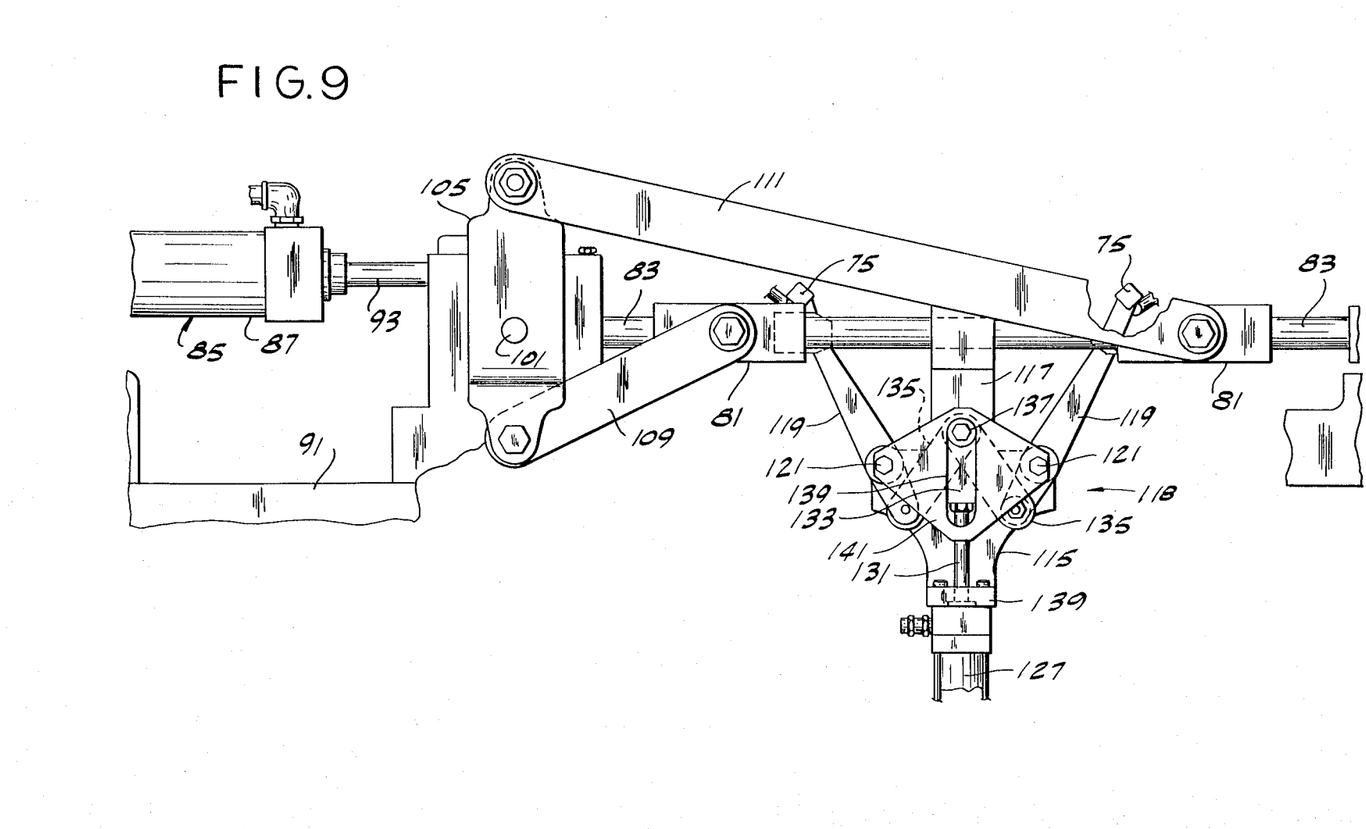
FIG. 9 is a side elevation of the FIG. 8A, B mechanism showing the sealing jaws and the pinch jaws open.
Figure 10:
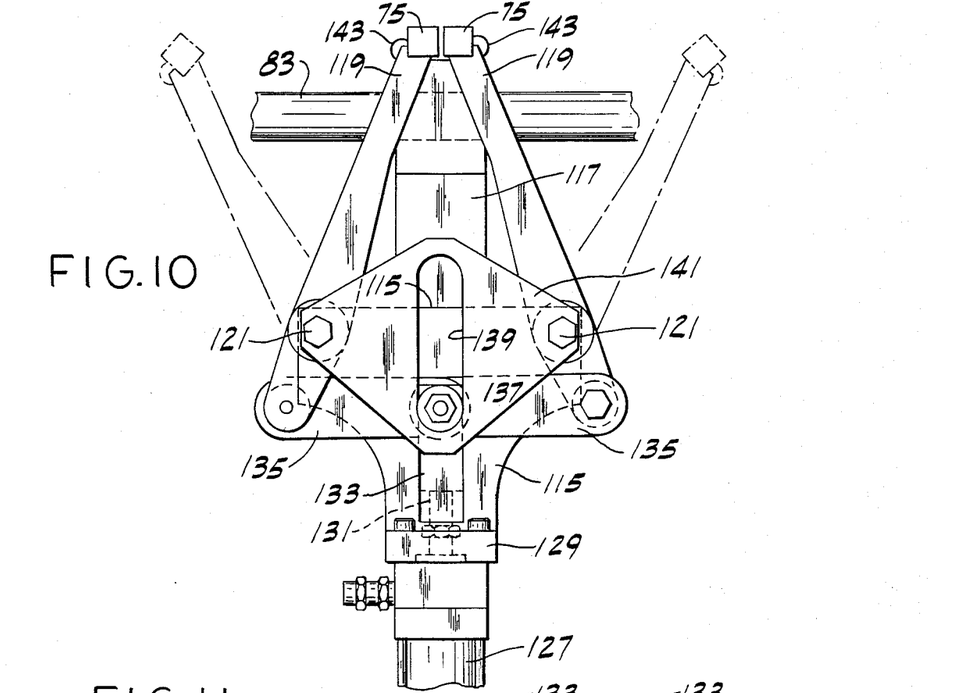
FIG. 10 an enlarged fragment of FIG. 9 with parts omitted showing the pinch jaws closed on the tubing (corresponding to FIG. 3)

Each pinch member 75 comprises an elongate bar, shown as being of square cross section, extending transversely of the tubing T generally parallel to the sealing members 17. The tubing T extends down between the two bars 75. Means indicated generally at 113 is provided mounting each bar for movement independently of the sealing jaws toward and away from the tubing. As shown in FIGS. 8A and B, 9, 10 and 13, this means 113 comprises a pair of supports or brackets each designated 115, one of these being mounted by means of a hanger as indicated at 117 on the rod 83 at one side of the apparatus and the other being mounted also by means of a hanger as indicated at 117 on the rod 83 at the other side of the apparatus. Each pinch bar 75 extends horizontally transversely of the apparatus between the upper ends of a pair of arms 119 pivoted at 121 intermediate their ends on the brackets 115. Each pair of arms 119 is pivoted at 121 for swinging movement on a horizontal axis transverse to the apparatus below the sealing members 17. The two arms of each pair are at opposite sides of the apparatus, and extend up from said axis. Each pinch bar 75 is fastened as indicated at 123 to and extends between the upper ends of the arms of the respective pair of arms. The arms are adapted to be swung in and out to swing the pinch bars 75 between the open and closed positions by means indicated generally at 125 independently of the sealing jaw comprising a pair of air cylinders each designated 127, each mounted at its upper end, which is its head end, on the bottom of a bottom leg 129 of a respective bracket 115. The piston rod 131 of each cylinder 127 extends up through the respective leg 129 and has a clevis 133 at its upper end. Toggle links 135 interconnect the clevis at the upper end of the piston rod of each cylinder and the lower ends of the pinch bar arms 119. The arrangement is such that, with the piston rods 131 extended (up) as shown in FIG. 9, the arms 119 are swung out and the pinch bars 75 are open. On retracting (lowering) the piston rods, the arms are swung in to close the pinch bars as shown in solid lines in FIGS. 10 and 12. Each clevis 133 carries a roller 137 movable in a vertical guide slot 139 in a guide plate 141 secured to the respective bracket 115 by bolts which constitute the pivots 121 for the arms 119.

The air blowing means 77 comprises a pair of air delivery tubes 143, one on each of the pinch bars 75, each extending lengthwise of the pinch bar on the outside of the pinch bar, being secured to the pinch bar as by welding at 145. Each air delivery tube has a flexible air delivery line 147 connected to one of its ends, is closed at its other end as indicated at 149, and has a series of air delivery holes 151 spaced at intervals along its length. These holes are directed downwardly and inwardly (see FIG. 12) for blowing air downwardly and inwardly on opposite sides of the tubing T against opposite sides of the seal which has just been made by the sealing members 17 as the sealing members open, effectively and quickly to cool the seal.

Figure 11:
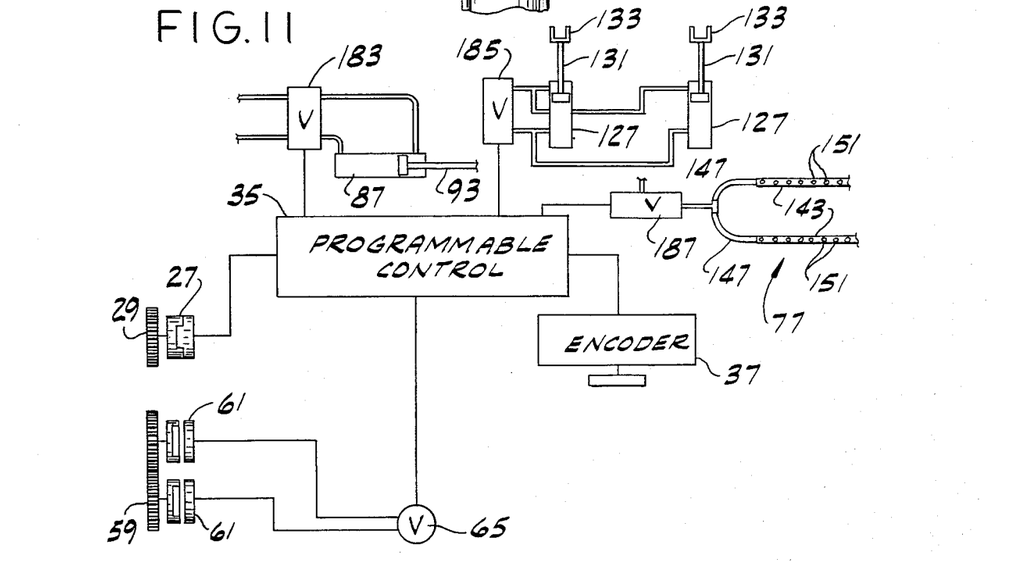
FIG. 11 is a control circuit diagram.

The air cylinder 87 for actuating the sealing jaws 17 is under control of a suitable air valve 183 which is in turn under control of the programmable control 35 as illustrated in FIG. 11. When the scale 67 has weighed out the quantity of product (the "fill") to be delivered for a package, and has dumped the product for delivery down through the mandrel 13 into the tubing T, control 35 transmits a signal to set the valve 183 for actuating the cylinder 87 to retract its piston rod 93 to close the sealing jaws 17. The valve is subsequently set to effect extension of the piston rod to bring the jaws 17 back to their open position. The air cylinders 127 for swinging the pinch bars 75 in and out are under control of a suitable air valve 185 which, as illustrated in FIG. 11, is also under control of the programmable control 35, the latter functioning to set the valve 185 for actuating the cylinders 127 to retract their piston rods 131 thereby to swing the pinch bars 75 from their open to their closed position, and to set the valve 185 for actuating the cylinders 127 to retract their piston rods 131 thereby to swing the pinch bars from their closed to their open position, with appropriate timing relative to the closing and opening of the jaws. Generally, the timing is such that valve 185 is set to close the pinch bars 75 just before the sealing jaws 17 close, and set to open the pinch bars 75 after the sealing jaws 17 have opened generally to their fully open position. Air is delivered to the air tubes 143 from a suitable source (not shown) via a suitable air valve 187 and the flexible lines 147. The valve 187 is under control of the programmable control 35, the latter functioning to open the valve 187 for blowing cooling air on the seal just made as the sealing jaws 17 start to open, and to close valve 187 to cut off the air about when the jaws are fully open.

A cycle of operation of the apparatus may be regarded as starting with the sealing jaws 17 open, the pinch bars 75 open, and the lower end of the tubing T having an S1 seal in the horizontal plane of the sealing jaws as shown in FIG. 1. This seal S1 is cooled and set. A completed package P with an S2 seal (also cooled and set) at the top is dropping away. Product for the next package fill has been and is being delivered to the lower end of the tubing T, being held in by the cooled and set seal S1.

Under control of the programmable control 35, a package length L of the tubing T is fed down between the open pinch bars 75 and the open sealing jaws 17 (FIG. 2). Valves 185 and 87 are then actuated to (a) cause the pinch bars 75 to swing in toward one another to their closed position pinching the tubing T closed above the level (the horizontal plane) of the sealing jaws (see FIGS. 3 and 10) and (b) cause the sealing jaws 17 to close upon the tubing T below the pinch in the tubing made by the pinch bars, with the closure of the pinch bars 75 on the tubing T occurring before, and generally just before, the sealing jaws 17 close on the tubing (see FIG. 3). The closure of the pinch bars 75 on the tubing, pinching the tubing closed above the level of the sealing jaws, occurs after the tubing T has been fed downwardly each package length interval L and following the completion of the delivery of the fill for the next package to be formed, thereby to keep product for the next fill from dropping down in the tubing on to the next seal to be made. Following the closure of the pinch bars 75, the sealing jaws 17 complete their closure to form the next seal as illustrated in FIG. 3, and the knife at 71 is actuated to cut through the tubing between the seals S2 and S1 to sever the completed package P from the tubing. Valve 87 is then set by control 35 to cause the sealing jaws 17 to open (see FIG. 4). Valve 185 remains in its setting for closure of the pinch bars 75 to hold the pinch on the tubing. While thus holding the pinch to keep product from dropping down into the next seal as the sealing jaws 17 open, control 35 opens valve 187 to deliver air to the tubes 143 for blowing air down and in on the seal from opposite sides to cool it as the jaws 17 open (see FIGS. 4 and 5). As the jaws 17 open, the completed package P drops away, the air blowing down and in on the seal S1 at the lower end of tube T below the pinch bars 75 to cool it and set it before the pinch bars open and product drops down onto seal S1. After a cooling interval, under control of control 35, valve 187 closes to cut off delivery of air and valve 185 is set to open the pinch bars, thus returning to the condition illustrated in FIG. 1 for starting another cycle.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. The method of forming, filling, and sealing packages comprising:

forming flexible packaging material into tubing, the tubing extending downwardly;

feeding the tubing downwardly and heat sealing it to form transverse seals spaced at package length intervals, the seals being formed by a pair of sealing members movable relative to one another between a fully open position and a closed position in sealing engagement with the tubing; and delivering a quantity of the product with which the packages are to be filled into the tubing to provide a fill for each package;

wherein the improvement comprises:

pinching the tubing closed above the sealing members after the tubing has been fed downwardly each package length interval and following the completion of the delivery of the fill for the next package to be formed, thereby to keep product for the next fill from dropping down in the tubing onto the next seal;

closing the sealing members to form the next seal;

opening the sealing members to their fully open position;

maintaining the pinch as the sealing members open generally until they reach their fully open position;

and, while so maintaining the pinch to keep product from dropping down onto the next seal as the sealing members open generally until they reach their fully open position, blowing air on the seal to cool it starting with the initial opening movement of the sealing members and continuing generally until they reach their fully open position.

2. The method of claim 1 wherein the air is blown down on the seal from the vicinity of the pinch.

3. The method of claim 2 wherein the air is blown down and in on opposite sides of the tubing against opposite sides of the seal from the vicinity of the pinch.

4. Apparatus for forming, filling and sealing packages comprising:

means for forming flexible packaging material into tubing;

a pair of sealing members extending transversely of the tubing for heat sealing it to form transverse seals across the tubing spaced at package length intervals, the tubing extending down between the sealing members;

means for moving the sealing members relatively to one another between a fully open position spaced from one another, enabling relative movement of the tubing and sealing members to provide a package length of tubing extending down from the level of the sealing members, and a closed position in sealing engagement with the tubing;

means for delivering a quantity of the product with which the packages are to be filled into the tubing to provide a fill for each package;

said apparatus being characterized in having:

a pair of pinch members extending transversely of the tubing generally parallel to the sealing members, the tubing extending down between the pinch members;

the pinch members being movable relatively to one another, and relatively to the sealing members and the tubing, between an open position enabling the state relative movement of the tubing and sealing members to provide the said package length of tubing extending down from the level of the sealing members, and a closed position in engagement with and pinching the tubing closed above the level of the sealing members;

the pinch members being movable independently of the sealing members so that they may remain in their closed position while the sealing members move to their fully open position;

means associated with the pinch members for blowing air on each transverse seal formed across the tubing by the sealing members upon opening of the sealing members following the formation of the seal;

means for controlling said pinch members independently of the sealing members to cause them to close on the tubing as the sealing members come together to form a transverse seal, to remain closed generally until the sealing members reach their fully open position, and then to open generally when the sealing members reach their fully open position; and means for controlling the blowing means to cause it to blow air on each seal starting with the initial opening movement of the sealing members exposing the seal and continuing generally until the sealing members reach their fully open position, while the pinch members remain closed.

5. Apparatus as set forth in claim 4 wherein the air blowing means is arranged to blow air down on the seal from the vicinity of the pinch.

6. Apparatus as set forth in claim 5 wherein the air blowing means is arranged to blow air down and in on opposite sides of the tubing against opposite sides of the seal from the vicinity of the pinch.

7. Apparatus as set forth in claim 4 wherein the air blowing means is carried by the pinch members.

8. Apparatus as set forth in claim 7 wherein the air blowing means is arranged on the pinch members to blow air down and in on opposite sides of the tubing against opposite sides of the seal from the vicinity of the pinch.

9. Apparatus as set forth in claim 8 wherein each pinch member comprises an elongate bar, wherein there is provided means mounting each bar for movement toward and away from the tubing, and wherein the air blowing means comprises an air tube on each of said bars extending lengthwise of the bar and having openings spaced at intervals along its length for exit of air therefrom to blow down and in on opposite sides of the seal.

10. Apparatus as set forth in claim 9 wherein the means mounting the pinch bars for movement toward and away from the tubing comprises a pair of pivoted arms for each bar, each pair being pivoted for swinging movement on an axis transverse to the apparatus below the sealing members, the two arms of each pair are at opposite sides of the apparatus, and extend up from said axis, each bar extending between the upper ends of the arms of the arms of the respective pair, and wherein air cylinders are provided for operating the arms.

* * * * *